(12) United States Patent
Shi et al.

(10) Patent No.: US 12,712,735 B2
(45) Date of Patent: Aug. 18, 2026

(54) DEVICE INTERACTION METHOD AND APPARATUS, ELECTRONIC DEVICE, STORAGE MEDIUM

(71) Applicant: Beijing Xiaomi Mobile Software Co., Ltd., Beijing (CN)

(72) Inventors: Xinling Shi, Beijing (CN); Mingqi Ju, Beijing (CN); Chensong Ma, Beijing (CN); Minghan Li, Beijing (CN); Qian Dai, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 84 days.

(21) Appl. No.: 18/653,288

(22) Filed: May 2, 2024

(65) Prior Publication Data

US 2025/0038986 A1 Jan. 30, 2025

(30) Foreign Application Priority Data

Jul. 28, 2023 (CN) ........................ 202310945479.5

(51) Int. Cl.

*H04L 9/32* (2006.01)
*G06F 21/34* (2013.01)
*H04L 9/06* (2006.01)
*H04L 9/08* (2006.01)
*H04L 9/40* (2022.01)
*H04W 12/06* (2021.01)

(52) U.S. Cl.

CPC ............ *H04L 9/3234* (2013.01); *G06F 21/34* (2013.01); *H04L 9/0618* (2013.01); *H04L 9/0825* (2013.01); *H04L 9/3247* (2013.01); *H04L 63/0428* (2013.01); *H04L 63/08* (2013.01); *H04L 63/0853* (2013.01); *H04W 12/06* (2013.01)

(58) Field of Classification Search

CPC ... H04L 9/3234; H04L 9/0618; H04L 9/0825; H04L 9/3247; H04L 63/0428; H04L 63/08; H04L 63/0853; G06F 21/34; H04W 12/06

See application file for complete search history.

(56) References Cited

U.S. PATENT DOCUMENTS

2016/0065374 A1* 3/2016 Sauerwald ............ H04L 9/0825 726/19
2020/0235932 A1 7/2020 Gehrmann
2024/0004982 A1* 1/2024 Fang ................ H04M 1/72463

OTHER PUBLICATIONS

Extended European Search Report issued in Application No. 24179187.0 dated Aug. 30, 2024, 8 pages.

* cited by examiner

*Primary Examiner* — Cheng-Feng Huang
(74) *Attorney, Agent, or Firm* — Finnegan, Henderson, Farabow, Garrett & Dunner, L.L.P.

(57) ABSTRACT

A method for device interaction includes: receiving identity authentication information input by a user in a case that a cross-device identity authentication function of a first device is enabled; and sending an identity authentication request to a second device that has established communication with the first device, wherein the identity authentication information is carried in the identity authentication request, and the identity authentication request is configured to request the second device in a locked state to perform identity authentication according to the identity authentication information.

11 Claims, 11 Drawing Sheets

DEVICE INTERACTION METHOD AND APPARATUS, ELECTRONIC DEVICE, STORAGE MEDIUM

CROSS REFERENCE

The present application is based upon and claims priority to Chinese Patent Application No. 202310945479.5, filed on Jul. 28, 2023, and the entire contents thereof are incorporated herein by reference.

TECHNICAL FIELD

The present disclosure relates to the technical field of identity authentication, and in particular to a device interaction method and apparatus, electronic device, and storage media.

BACKGROUND

With the rapid development of communication technology, cross-device communication interaction has brought more and more convenience to life. When operating multiple devices at the same time, it may need to authenticate and authorize the access device among the multiple devices before using the cross-device communication and interaction.

SUMMARY

According to a first aspect of the present disclosure, a device interaction method includes: receiving identity authentication information input by a user in a case that a cross-device identity authentication function of the first device is enabled; and sending an identity authentication request to a second device that has established communication with the first device, wherein the identity authentication information is carried in the identity authentication request, and the identity authentication request is configured to request the second device in a locked state to perform identity authentication according to the identity authentication information.

According to a second aspect of the present disclosure, a device interaction method includes: receiving an identity authentication request sent by a first device that has established communication with the second device, wherein a cross-device identity authentication function of the second device is enabled and the second device is in a locked state; and performing identity authentication in response to the identity authentication request.

According to a third aspect of the present disclosure, an electronic device includes: a processor; and a memory configured to store instructions executable by the processor; wherein the processor is configured to: receive identity authentication information input by a user in a case that a cross-device identity authentication function of the electronic device is enabled; and send an identity authentication request to a second device that has established communication with the electronic device, wherein the identity authentication information is carried in the identity authentication request, and the identity authentication request is configured to request the second device in a locked state to perform identity authentication according to the identity authentication information.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and together with the description, serve to explain the principles of the disclosure.

DETAILED DESCRIPTION

Exemplary embodiments will be described in detail herein, examples of which are illustrated in the accompanying drawings. When the following description refers to the drawings, the same numbers in different drawings refer to the same or similar elements unless otherwise indicated. The implementations described in the following exemplary embodiments do not represent all implementations consistent with the present disclosure. Rather, they are merely examples of apparatus and methods consistent with aspects of the disclosure as detailed in the appended claims.

Figure 1:
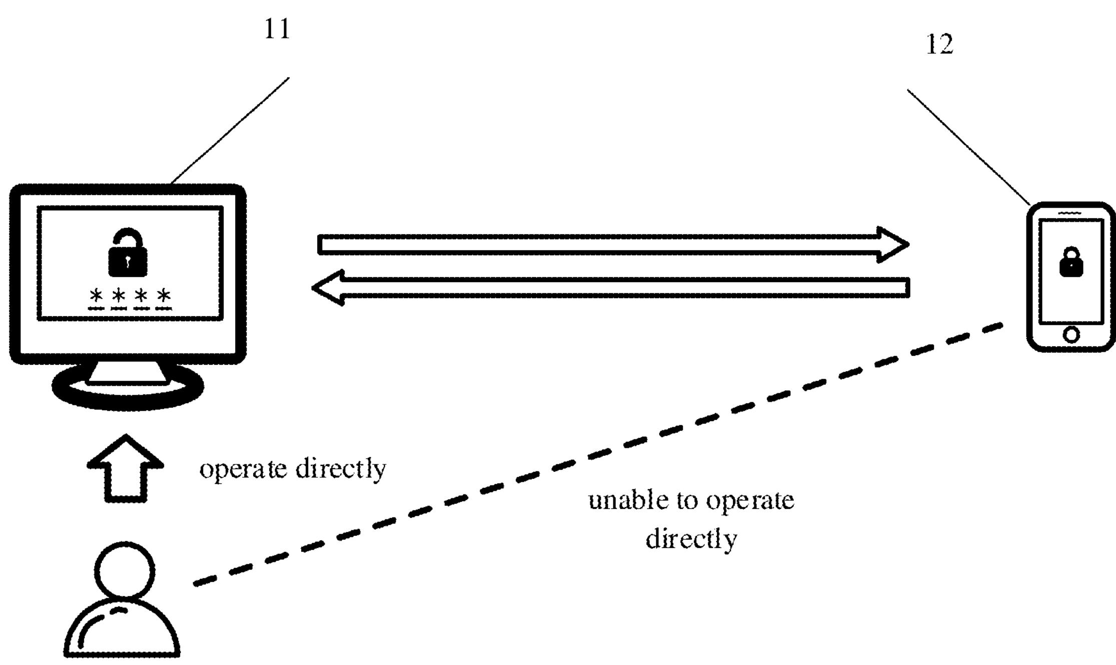
FIG. 1 is a schematic diagram illustrating a cross-device communication interaction failure according to an exemplary embodiment.

Cross-device communication and interaction is a new experience for users. It can break through the limitations of a single device and allow users to perform information interaction with the second device on the first device and. FIG. 1 is a schematic diagram illustrating a cross-device communication interaction failure according to an exemplary embodiment. As shown in FIG. 1, when the lock screen password of the second device 12 is in the locked state, it indicates that the second device 12 is in the locked state without passing the identity authentication, so the data of the second device 12 is in the encrypted state. The user of the first device 11 cannot directly operate the second device, nor can the user perform identity authentication on the second device. If the user is inconvenient or unable to directly authenticate the second device to unlock the locked state, the cross-device communication interaction between the first device and the second device will not be possible.

Based on this, embodiments of the present disclosure propose a device interaction method, which enables identity authentication of the second device when the second device is in a locked state, thereby improving the convenience of cross-device communication and interaction.

Figure 2:
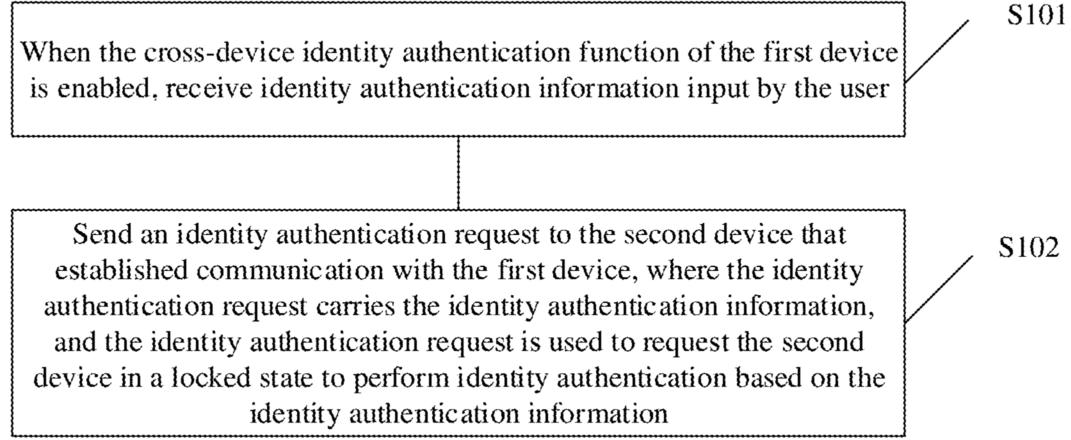
FIG. 2 is a flowchart of a device interaction method according to an exemplary embodiment.

FIG. 2 is a flowchart of a device interaction method according to an exemplary embodiment. As shown in FIG. 2, the device interaction method is applied to a first device. The first device executing the device interaction method includes steps S101 and S102.

Step S101: When the cross-device identity authentication function of the first device is enabled, receive identity authentication information input by the user; and Step S102: Send an identity authentication request to the second device that established communication with the first device, where the identity authentication request carries the identity authentication information, and the identity authentication request is used to request the second device in a locked state to perform identity authentication based on the identity authentication information.

In the embodiment of the present disclosure, the device interaction method is suitable for cross-device communication interaction scenarios. For example, in a cross-device communication scenario, a first device needs to access a second device, but when the second device is in a locked state, the first device can, by performing the device interaction method, realize the identity authentication of the second device through the first device when the user is inconvenient or unable to directly authenticate the second device.

It should be noted that the first device sends an identity authentication request to the second device, and the second device receives the identity authentication request and performs identity authentication based on the identity authentication request. Accordingly, in cross-device communication interaction, the first device can be understood as the requesting device, and the second device can be understood as the accessed device.

For example, the first device and the second device may be devices of the same type, or may be devices of different types. Both the first device and the second device may include mobile terminal devices or wearable devices. The mobile terminal device may include: a smart phone, a notebook or a tablet; and the wearable device may include a smart bracelet or a smart watch, which is not limited in the embodiment of the present disclosure.

In step S101, the second device is in a locked state, which may include that the second device is in a screen-locked state and the first device cannot process the data of the second device, or may include that even if the second device is in a screen-unlocked state, the first device cannot process the data situation of the second device. Accordingly, when the second device is in a locked state, identity authentication is required to process the data of the second device. If the identity authentication is failed, the data of the second device is equivalent to being in an encrypted state, and the first device cannot process the data of the second device.

For example, if the lock screen password is entered incorrectly on the second device, the second device is still in the locked screen state. At this time, the user cannot access the images stored in the photo album of the second device through the first device. For another example, when the second device is in the screen unlocked state, since the data stored in the second device is highly private data, such as stored confidential files, the first device cannot directly access the data confidential files on a second device without passing the identity authentication.

The above-mentioned identity authentication information input by the user may include identity authentication information directly input by the user on the first device, and may also include identity authentication information indirectly input by the user through a third device. Here, the identity authentication information indirectly input by the user through the third device may include: the first device receiving the identity authentication information input by the user sent by the third device.

It should be noted that the input form of the identity authentication information directly input by the user on the first device may include: voice input, gesture input, touch input, etc., and the embodiment of the present disclosure does not limit this.

In the embodiment, the identity authentication information input by the user may be the authentication information registered on the second device, and the identity authentication on the second device may be implemented through the identity authentication information input by the user.

For example, the identity authentication information input by the user may include: lock screen password information, face information, gesture information, or fingerprint information, etc., which are not limited in this embodiment of the disclosure.

The above-mentioned cross-device identity authentication function of the first device and the cross-device identity authentication function of the second device are both used to verify whether the person who is enabling the function is a legitimate user, and to prevent illegal users from abusing the device to indirectly obtain access rights or maliciously failing the verification, causing the legitimate users cannot use the cross-device authentication feature.

In some embodiments, the method further includes: receiving first verification information; and if the first verification information is verified, enabling the cross-device identity authentication function of the first device.

Similarly, the device interaction method is executed for the second device, and the method further includes: receiving second verification information; and if the second verification information is verified, enabling the cross-device identity authentication function of the second device.

In this way, based on verifying the identity verification of the first device and the identity verification of the second device, the access permissions of the users of the two devices and the key information generated by the two devices can be made more secure to prevent illegal use.

In the embodiment, the first verification information and the second verification information may be the same information or different information. For example, the first verification information and the second verification information may both be fingerprint information or face information of the co-owners of the first device and the second device. For another example, the first verification information may be the co-owner's face information, and the second verification information may be the co-owner's fingerprint information.

It should be noted that during the process of enabling the cross-device identity authentication function of the first device and the second device, the interfaces of the first device and the second device may display an identity authentication request button, and the user triggers the identity authentication request button (for example, clicking operate the button or slide the button), then the first device and the second device will receive the enabling request of the cross-device identity authentication function, and respond to the enabling request to instruct the user to input the first verification information and the second verification information. After the user inputs the first verification information and the second verification information, the identity verification of the first device and the identity verification of the second device are respectively performed. Finally, when the identity verification of the first device and the identity verification of the second device are both verified, the cross-device identity authentication function of the first device and the cross-device identity authentication function of the second device are enabled.

In the embodiment, when the identity verification of the first device fails and the identity verification of the second device fails, both the first device and the second device reject the request to enable the cross-device identity authentication function. At this time, the cross-device identity authentication function of the first device and the second device are both disabled.

Figure 3:
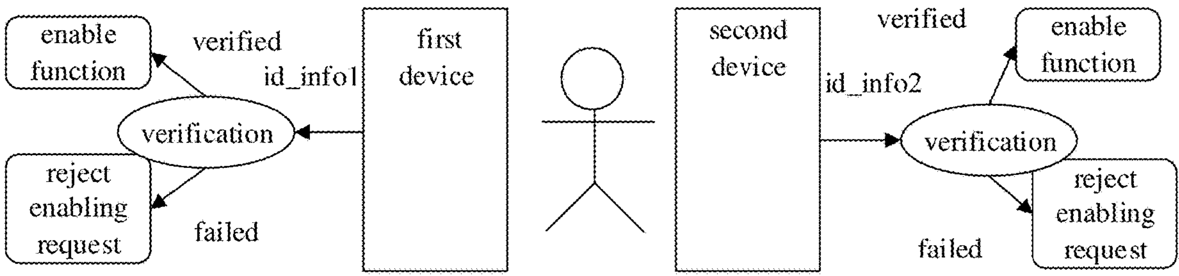
FIG. 3 is a schematic diagram of two devices performing identity verification to enable the function according to an exemplary embodiment.

For example, as shown in FIG. 3, the user can input the first verification information id_info1 on the first device, and based on the first verification information id_info1, it is judged whether the identity verification of the first device is passed. When the first verification information id_info1 successfully matches the identity registration information stored in the first device, it is determined that the identity verification of the first device is passed, that is, the user enabling the function of the first device is a legitimate user, and at this time cross-device identity authentication function of the first device is enabled. When the first verification information id_info1 fails to match the identity registration information stored in the first device, it is determined that the identity verification of the first device is failed, that is, the user enabling the function of the first device is an illegal user, and at this time the enabling request is refused.

Similarly, as shown in FIG. 3, the user can input the second verification information id_info2 on the second device, and based on the second verification information id_info2, it is judged whether the identity verification of the second device is passed. When the second verification information id_info2 successfully matches the identity registration information stored in the second device, it is determined that the identity verification of the second device is passed, that is, the user enabling the function of the first device is a legitimate user, and at this time cross-device identity authentication function of the second device is enabled. When the second verification information id_info2 fails to match the identity registration information stored in the second device, it is determined that the identity verification of the second device is failed, that is, the user enabling the function of the second device is an illegal user, and at this time the enabling request is refused.

In this embodiment of the present disclosure, for the first device, the method further includes:

performing identity verification on the first verification information through an identity verification module of the first device;

or, performing identity verification on the first verification information through a first verification sub-module configured by the cross-device identity verification module of the first device.

For the second device, the method further includes:

performing identity verification on the second verification information through an identity verification module of the second device;

or, performing identity verification on the second verification information through a second verification sub-module configured by the cross-device identity authentication module of the second device.

It should be noted that the identity verification module of the first device, the identity verification module of the second device, the first verification sub-module and the second verification sub-module are all used to provide the user with an identity verification function through which the legality of user identity can be verified. Here, the identity verification method may include password verification, gesture verification, fingerprint verification, etc., which are not limited in the embodiment.

The cross-device identity authentication module of the first device and the cross-device identity authentication module of the second device are both used to provide the user with a cross-device identity authentication function. The cross-device identity authentication function can support the first device to send the identity authentication request messages to the second device, and cross-device identity authentication function can support the second device to be able to perform identity authentication based on the identity authentication request.

In the embodiment, the trusted execution environment is a secure software environment that can protect the safe operation of the authentication module and reduce malicious operations or tampering. Therefore, in a scenario with a trusted execution environment, both the first device and the second device can directly perform identity verification through their own identity verification modules; in a scenario with a non-trusted execution environment, the first device and the second device respectively perform identity verification based on the first verification sub-module and the second verification sub-module. In this way, in the scenario of a non-trusted execution environment, the embodiment of the present disclosure uses a newly configured verification module for identity verification, which can improve the security of identity verification.

In step S102, the identity authentication request carries the identity authentication information input by the user. In this way, after the second device receives the identity authentication information input by the user, the identity authentication on the second device can be performed based on the identity authentication information input by the user. In this way, cross-device communication interaction between the first device and the second device can be established without manually unlocking the second device.

The identity authentication request carrying the identity authentication information input by the user may be directly carrying the identity authentication information, or may be carrying ciphertext information obtained by encrypting the identity authentication information. This is not limited in the embodiment of the present disclosure.

In this embodiment of the present disclosure, when the second device is in a locked state, the first device can enable the second device to complete the identity authentication based on the identity authentication request sent by the first device, thereby establishing the cross-device communication interaction between the first device and the second device.

In some embodiments, the method further includes:

obtaining first shared information; and before sending the identity authentication request to the second device that established communication with the first device, the method further includes:

generating the identity authentication request based on the first shared information and the identity authentication information.

In the embodiment, the first shared information is information known to the user and can be used as root information for deriving the key. The first device can obtain the identity authentication request based on the first shared information and the identity authentication information. In the embodiment of the present disclosure, the same information may be input to the first device and the second device as the first shared information.

In the embodiment of the present disclosure, obtaining the first shared information may include: using the information input on the first device as the first shared information; or using the information obtained by scanning the QR code on the first device, as the first shared information; or, using the information sent by the server to the first device as the first shared information.

For the second device, the second device obtains the second shared information to decrypt the identity authentication request. The second shared information matches the first shared information. The corresponding first shared information and the second shared information may be the same information, or the first shared information may be obtained by matching the second shared information. This matching process includes but is not limited to format conversion.

In the embodiment of the present disclosure, in order to simplify the processing flow, the first shared information and the second shared information can be set to be the same. Embodiments of the present disclosure may use the same information input on the second device and the first device as the first shared information and the second shared information, and the same information includes but is not limited to the same identification code.

It should be noted that the same identification code can include a string of numbers, letters and/or punctuation, and can be used to authenticate the identity of the device user. Illustratively, the identification code includes a personal identification number (PIN), which is not limited in this embodiment of the disclosure.

In the embodiment of the present disclosure, the information obtained by scanning the QR code with the first device is used as the first shared information. Here, the information obtained by the first device scanning the QR code of the second device may be used as the first shared information. For the second device, the information contained in the QR code of the second device is the second shared information. In this way, the first device and the second device can have the same information.

It should be noted that both the above-mentioned first device and the second device have a camera function. Through the camera function of the first device, the QR code of the second device can be scanned to obtain the first shared information. The camera function of the second device can also be used to scan the QR code of the first device to obtain the second shared information.

In the embodiment of the present disclosure, the server may send the same information to the first device and the second device as the first shared information and the second shared information. Accordingly, the first device and the second device can respectively request the same server to send information, and then the same information sent by the server to the first device and the second device can be used as the first shared information of the first device and the second shared information of the second device respectively. In the embodiment, in order to prevent the leakage and tampering of the shared information, the server can be used to sign and encrypt the delivered information, thereby ensuring the security of the delivered information.

Figure 4:
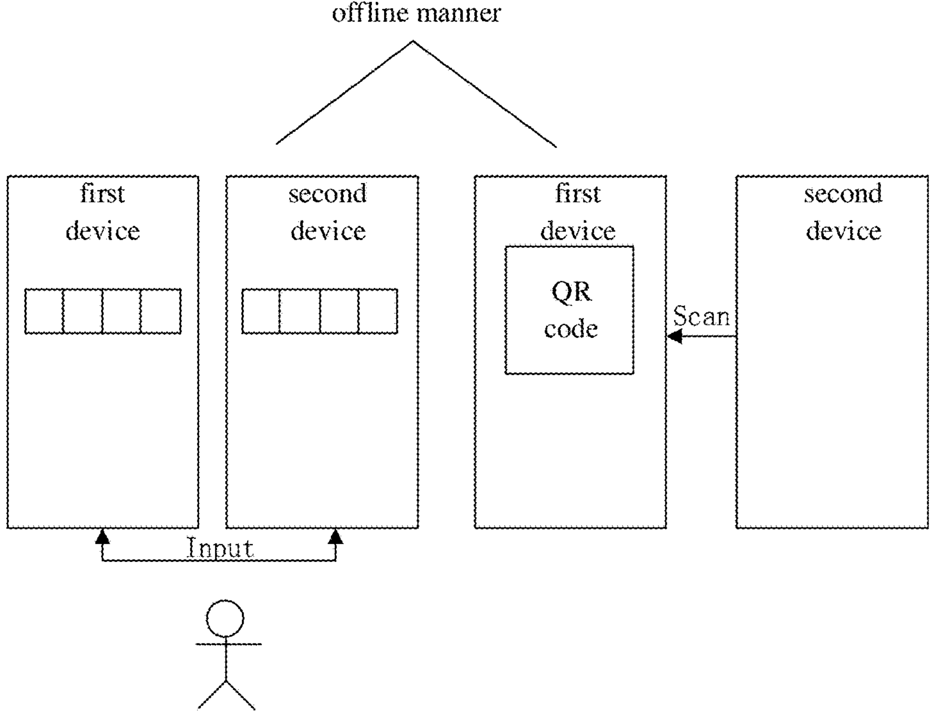
FIG. 4 is a schematic diagram of obtaining shared information in an offline manner according to an exemplary embodiment.

FIG. 4 is a schematic diagram of obtaining the shared information in an offline manner according to an exemplary embodiment. As shown in FIG. 4, the same identification code input on the first device and the second device is used as the first shared information and the second shared information, or the information obtained by scanning the QR code of the first device is used as the second shared information and the information contained in the QR code of the first device is used as the first shared information, these all belong to obtaining the shared information in the offline manner.

Figure 5:
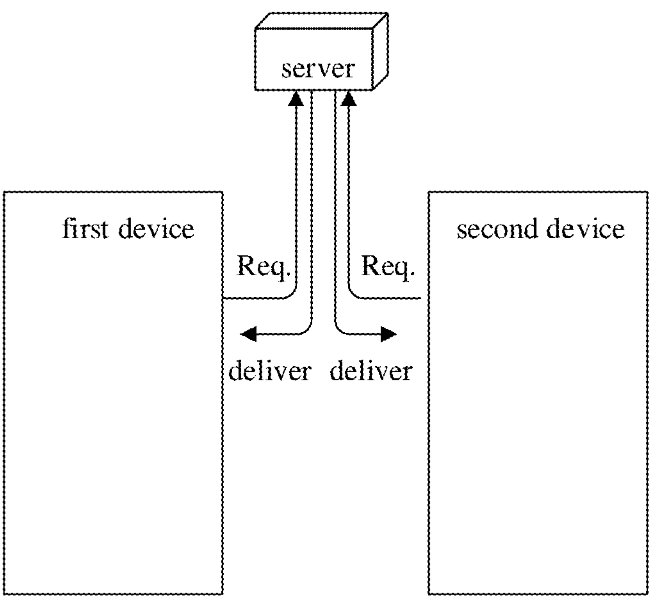
FIG. 5 is a schematic diagram of obtaining shared information in an online manner according to an exemplary embodiment.

As another example, FIG. 5 is a schematic diagram of obtaining shared information in an online manner according to an exemplary embodiment. As shown in FIG. 5, the same information delivered by the server is used as the first shared information and the second shared information. This method requires the establishment of communication connections between the server and the first device and the second device respectively, which belongs to obtaining the shared information in the online manner.

In the embodiment, generating the identity authentication request based on the first shared information and the identity authentication information may include: encrypting the identity authentication information based on the first shared information to obtain the identity authentication request.

In some embodiments, generating the identity authentication request based on the first shared information and the identity authentication information includes:

based on the first shared information, encrypting the identity authentication information to obtain ciphertext information; and generating the identity authentication request based on the ciphertext information.

The above ciphertext information is the information obtained by encrypting the identity authentication information input by the user. In this way, identity authentication can be made more secure through encryption.

In the embodiment, before encrypting the identity authentication information input by the user, the key information of the first device can be obtained based on the first shared information, so as to encrypt the identity authentication information input by the user by the key information of the first device, to obtain the ciphertext information.

It should be noted that encrypting the identity authentication information input by the user with the key information of the first device to obtain ciphertext information may include: encrypting the identity authentication information input by the user with a functional key stored in the first device to obtain the ciphertext information, and it may also include: encrypting the identity authentication information input by the user using two keys with different functions stored in the first device to obtain the ciphertext information.

In some embodiments, the encrypting the identity authentication information based on the first shared information to obtain ciphertext information, including:

- obtaining a first key and a second key based on the first shared information;
- encrypting the identity authentication information input by the user based on the first key to obtain encrypted information of the first device;
- signing the encrypted information of the first device based on the second key to obtain signature information of the first device; and
- splicing the signature information of the first device and the encrypted information of the first device to obtain the ciphertext information.

In the embodiment, the key information of the first device is generated after the cross-device identity authentication function of the first device is enabled. The key information of the first device includes the first key and the second key. The first key is a key used for encryption, and the second key is a key used for signing.

It should be noted that after obtaining the first shared information, the first key can be obtained based on the first shared information and a preset encryption string; and the second key can be obtained based on the first shared information and a preset signature string. It should be noted that the preset encryption string and the preset signature string are different strings. In some embodiments, the preset encryption string and the preset signature string have different number of characters; or, the preset encryption string and the preset signature string have different character objects.

Here, obtaining the first key based on the first shared information and the preset encryption string may include: inputting the first shared information and the preset encryption string into a first encryption model to obtain the first key.

The obtaining the second key based on the first shared information and the preset signature string may include: inputting the first shared information and the preset signature string into the second encryption model to obtain the second key.

It should be noted that the first encryption model and the second encryption model may be the same encryption model, or they may be different encryption models. Both the first encryption model and the second encryption model may include a hash (Hash) model or a key derivation function (KDF) model, which is not limited in this embodiment of the disclosure.

For the second device, key information of the second device is also generated based on the second shared information. The second key information is used to decrypt the identity authentication request to implement identity authentication.

In the embodiment of the present disclosure, after the key information of the first device is generated, the key information of the first device can be stored in the secure area of the first device. In this way, the security of the key information storage of the first device can be improved, and security risks caused by the leakage of the key information of the first device can be prevented. Similarly, the key information of the second device is also stored in the secure storage area of the second device. In this way, the security of the key information storage of the second device can be improved, and security risks caused by the leakage of the key information of the second device can be prevented.

Here, the secure area of the first device and the secure area of the second device may both be areas corresponding to the trusted execution environments (TEE) of the first device and the second device. It should be noted that, in the case where the first device and the second device do not have a trusted execution environment, the key information of the first device and the key information of the second device may both be encrypted and then stored.

Figure 6A:
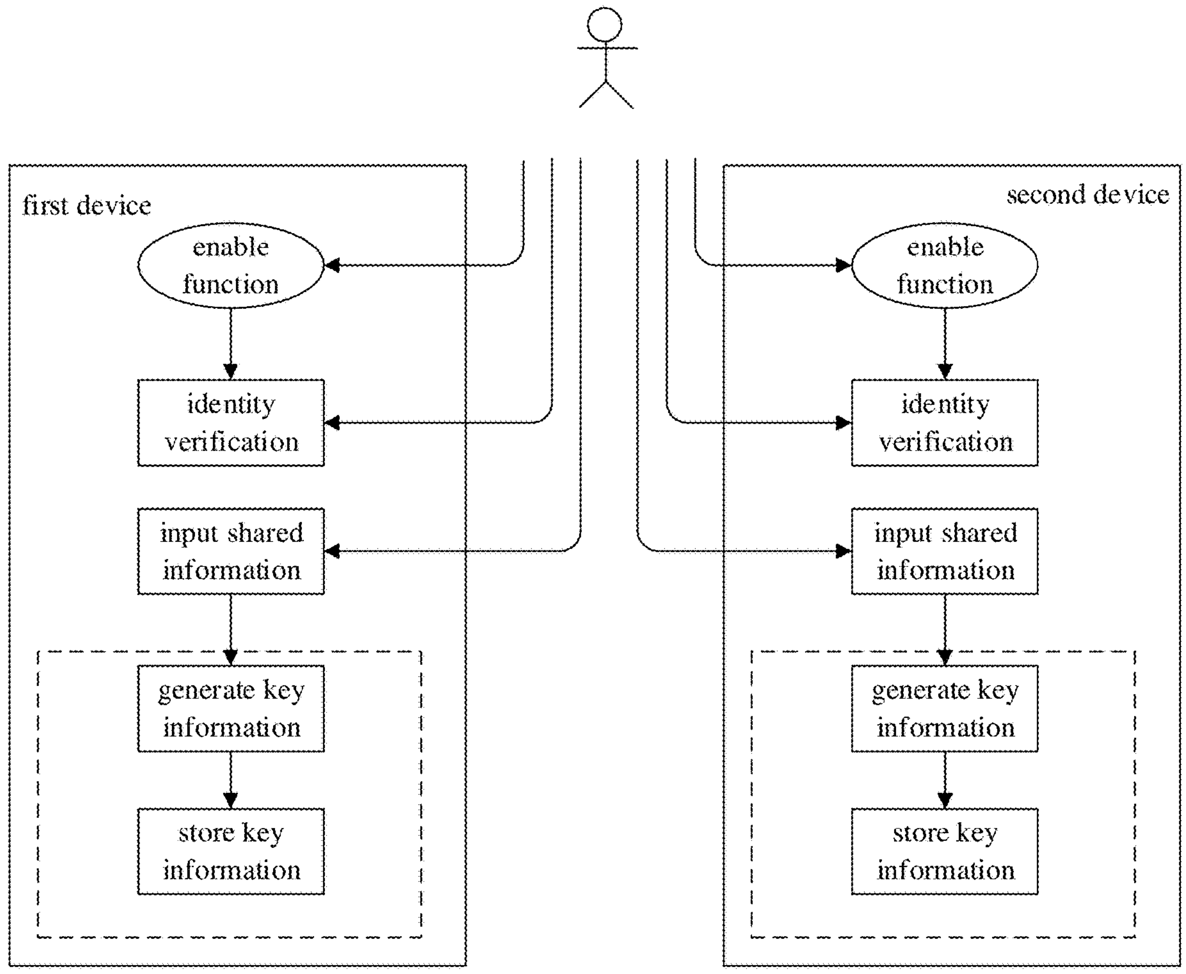
FIG. 6A is a schematic block diagram illustrating key generation to storage according to an exemplary embodiment.

FIG. 6A is a schematic block diagram showing key information from generation to storage according to an exemplary embodiment. As shown in FIG. 6A, after the cross-device identity authentication function of the first device is enabled through the identity verification of the first device, and the cross-device identity authentication function of the second device is enabled through the identity verification of the second device, the first device and the second device will generate and store key information based on the shared information.

Figure 6B:
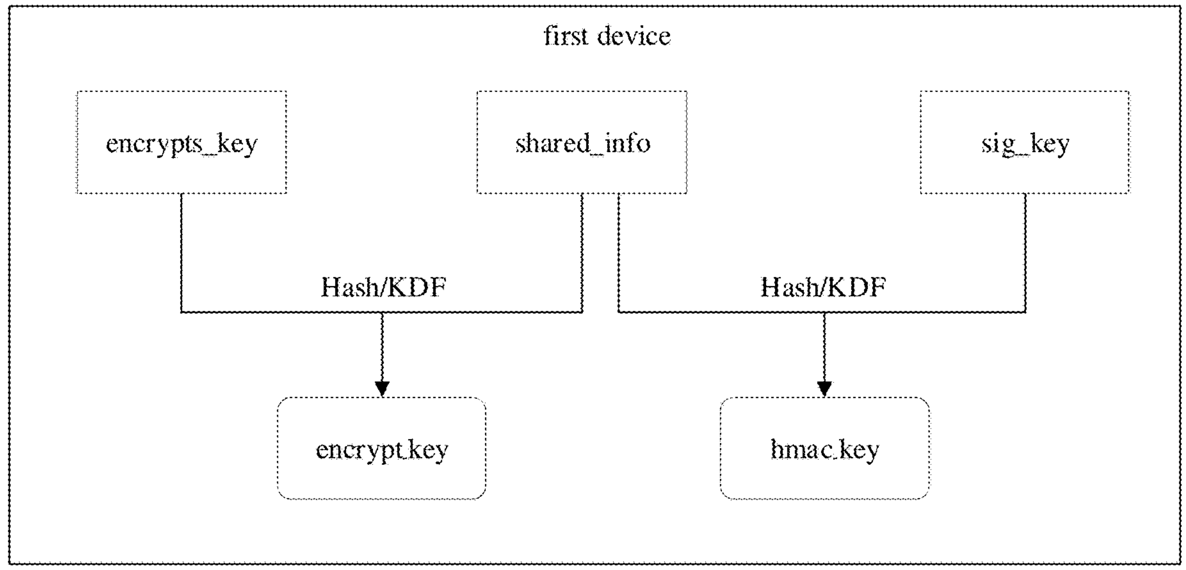
FIG. 6B is a schematic diagram of key information generation by the first device according to an exemplary embodiment.

FIG. 6B is a schematic diagram of key information generation by the first device according to an exemplary embodiment. As shown in FIG. 6B, shared_info is the first shared information; encrypts_key is the preset encryption string; sig_key is the preset signature string; encrypt_key is the first key; hmac_key is the second key; the encrypt_key may be obtained by inputting the shared_info and the encrypts_key to a Hash model or KDF model; and the hmac_key may be obtained by inputting the shared_info and sig_key to the Hash model or KDF model.

It should be noted that, as can be seen from FIGS. 3, 4, 6A and 6B, the identity verification of the first device and the second device and the generation of key information of the first device and the second device in the device interaction method all may be implemented offline, which do not require the support of the server. It is possible to expand the applicable scenarios of the device interaction method, and make the device interaction method universal.

In the embodiment of the present disclosure, in the process of obtaining the encrypted information of the first device, the first key and the identity authentication information input by the user can be input into the third encryption model to obtain the encrypted information of the first device. The third encryption model includes but is not limited to a Hash model, a symmetric encryption model or an elliptic curve algorithm encryption model.

In the process of obtaining the signature information of the first device, the second key and the encryption information of the first device can be input into the first signature model to obtain the signature information of the first device. The first signature model includes but is not limited to the Hash-based Message Authentication Code (HMAC) model.

In the embodiment of the present disclosure, after obtaining the encryption information of the first device and the signature information of the first device, the signature information of the first device and the encryption information of the first device are spliced to obtain ciphertext information. In some embodiments, splicing the signature information of the first device and the encrypted information of the first device to obtain the ciphertext information may include: splicing the signature information of the first device before the encrypted information of the first device to obtain the ciphertext information; or, splicing the signature information of the first device after the encrypted information of the first device to obtain the ciphertext information.

Here, the ciphertext information is obtained by splicing the signature information of the first device and the encrypted information of the second device, and then the identity authentication request generated based on the ciphertext information is sent to the second device, so that the second device can decrypt the ciphertext information based on the key information of the second device to achieve identity authentication on the second device. In this way, the first key and the second key are used to encrypt and sign the identity authentication information input by the user, which can reduce the situation in which the identity authentication information input by the user is obtained and tampered with, and improves the security of the identity authentication. Moreover, the encryption of the first device to obtain ciphertext information and the second device of decryption to obtain decrypted information can be implemented in the trusted execution environment of the two devices, which can further improve the security of identity authentication.

In some embodiments, encrypting the identity authentication information input by the user based on the first key to obtain encrypted information of the first device includes:

- performing data type conversion on the identity authentication information input by the user to obtain identity authentication information of byte array type; and
- encrypting the identity authentication information of byte array type using the first key, to obtain the encrypted information of the first device.

In the embodiment of the present disclosure, in the process of encrypting the identity authentication information input by the user to obtain the encrypted information of the first device, the data type of the identity authentication information input by the user needs to be converted into a byte array type.

It should be noted that after obtaining the identity authentication information of the byte array type, the identity authentication information of the byte array type can be passed to the encryption module of the TEE in the first device, and in the encryption module, the identity authentication information of byte array type is encrypted using the first key to obtain the encrypted information.

In the embodiment, the electronic device first converts the data type of the identity authentication information input by the user, and then encrypts the identity authentication information converted into the byte array type. In this way, the data types of encryption objects can be unified, making encryption universal.

In order to better understand the device interaction method performed by the first device, examples of embodiments of the present disclosure are as follows.

Figure 7:
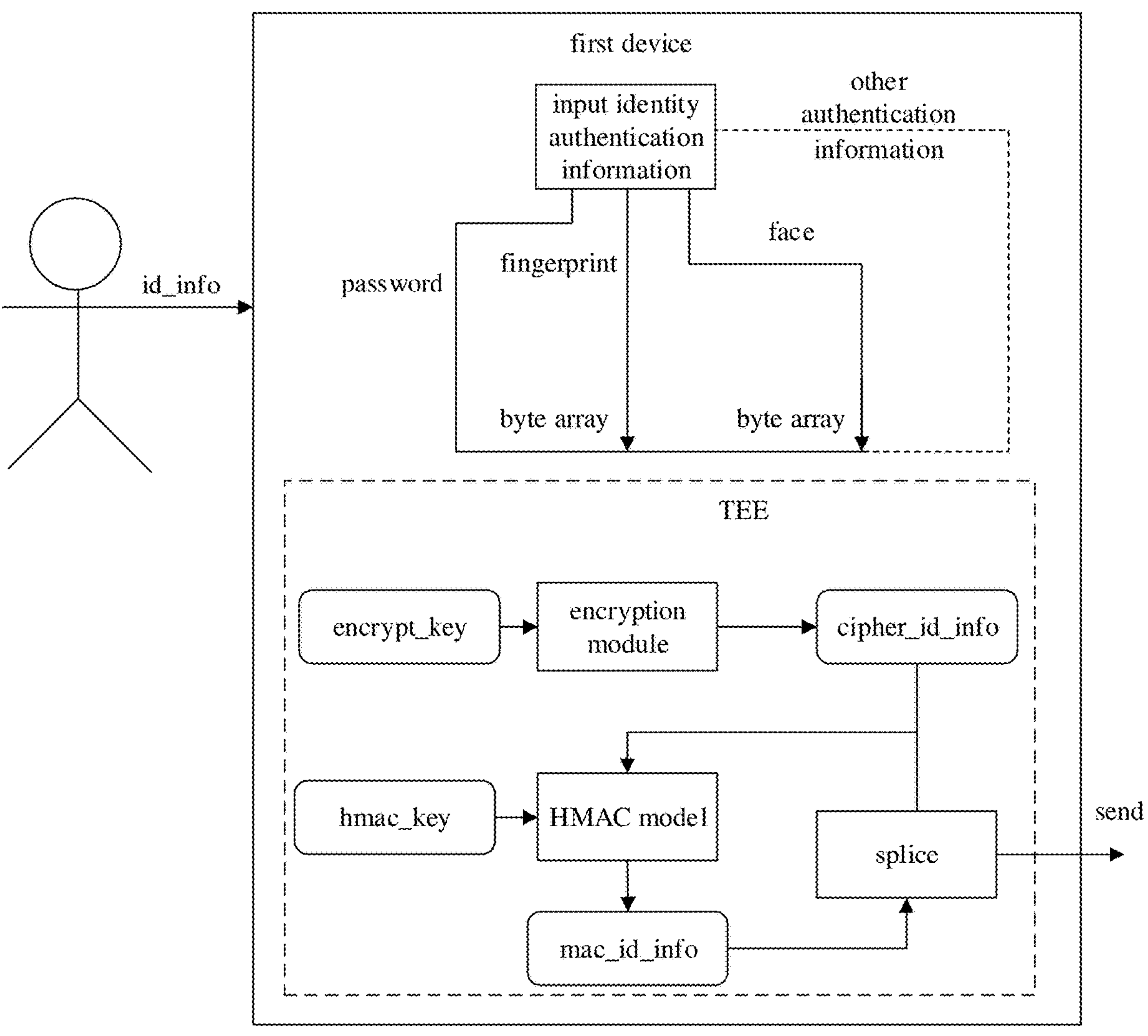
FIG. 7 is a schematic diagram of a first device performing a device interaction method according to an exemplary embodiment.

FIG. 7 is a schematic diagram of a device interaction method according to an exemplary embodiment performed by a first device. As shown in FIG. 7, the user inputs the identity authentication information id_info (for example, password data, fingerprint data, and face data). The first device first transfers the identity authentication information id_info input by the user to the encryption module of the TEE of the first device after the byte array type conversion, and then uses the first key encrypt_key to encrypt the byte array type identity authentication information to obtain the encryption information cipher_id_info of the first device; and inputs the second key hmac_key and the encryption information cipher_id_info of the first device to the HMAC model to obtain the signature information mac_id_info of the first device; finally, splices the encrypted information cipher_id_info of the first device and the signature information mac_id_info of the first device to obtain the ciphertext information, and send the identity authentication request generated based on the ciphertext information to the second device.

Figure 8:
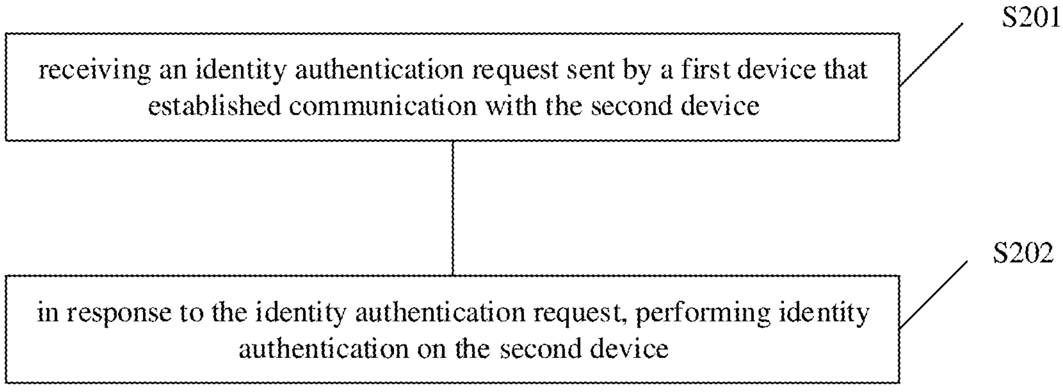
FIG. 8 is a flowchart of a device interaction method according to an exemplary embodiment.

An embodiment of the present disclosure also provides a device interaction method. FIG. 8 is a flowchart of device interaction according to an exemplary embodiment. As shown in FIG. 8, the device interaction method is applied to a second device. The second device executing the device interaction method includes steps S201 and S202.

Step S201: receiving an identity authentication request sent by a first device that established communication with the second device, wherein the cross-device identity authentication function of the second device is enabled and the second device is in a locked state; and Step S202: in response to the identity authentication request, performing identity authentication.

In the embodiment of the present disclosure, a communication connection is established between the first device and the second device. The communication connection method may include: Bluetooth or local area network, which is not limited in the embodiment of the present disclosure.

It should be noted that, by using the communication connection between the first device and the second device, the first device and the second device may realize sending by the first device the identity authentication request to the second device and receiving by the second device the identity authentication request. However, since the second device is in a locked state, the first device cannot access the data on the second device. Therefore, the first device needs to send the identity authentication request to the second device, so that the second device can perform identity authentication based on the identity authentication request, and only after the identity authentication is verified, the first device can access the data in the second device.

In the embodiment, during the process of the first device sending the identity authentication request to the second device, the cross-device identity authentication function of the first device and the cross-device identity authentication function of the second device are both enabled. Accordingly, during the process of the second device receiving the identity authentication request, the cross-device identity authentication function of the second device is enabled.

In some embodiments, the method further includes:

- obtaining the second shared information; and
- the performing identity authentication in response to the identity authentication request includes:
- performing identity authentication based on the second shared information and the identity authentication request in response to the identity authentication request.

The above-mentioned obtaining of the second shared information may include: using the information input on the second device as the second shared information; or using the information obtained by scanning the QR code by the second device as the second shared information; or, using the information sent by the server to the second device as the second shared information.

In the embodiment, after obtaining the second shared information, identity authentication can be performed based on the second shared information and the identity authentication request. Since the second shared information matches the first shared information, and the identity authentication request is generated based on the first shared information and the identity authentication information, the identity authentication request can be decrypted based on the second shared information for identity authentication.

In some embodiments, the performing identity authentication based on the second shared information and the identity authentication request includes:

- decrypting the identity authentication request based on the second shared information to obtain decrypted information; and
- performing identity authentication on the second device based on the decrypted information.

In the embodiment, the key information of the second device used to decrypt the identity authentication request can be obtained based on the second shared information, and then the identity authentication request is decrypted based on the key information of the second device to obtain decrypted information.

Here, after obtaining the decrypted information, the identity of the second device can be authenticated based on the decrypted information. In some embodiments, performing identity authentication on the second device based on the decrypted information may include: judging whether the decrypted information matches the identity registration information stored in the second device; and determining that the identity authentication on the second device is verified in response to the case that the decrypted information matches the identity registration information stored in the second device. When the decrypted information does not match the identity registration information stored in the second device, it is determined that the identity authentication of the second device is failed.

It should be noted that when the identity authentication of the second device is verified, authentication verified information can be sent to the first device, so that the first device can directly access the second device after receiving the authentication verified information.

Here, in the case that the identity authentication of the second device is verified, if the second device is in the locked state, the electronic device may switch the second device from the locked state to the unlocked state, or may not perform the switching operation, which is not limited by the embodiment of the present disclosure. In addition, when receiving the identity authentication request sent by the first device, the second device may be in an unlocked state or a locked state, which is not limited in this embodiment of the disclosure.

In the embodiment, the second device performs identity authentication on the second device in response to the identity authentication request sent by the first device, which enables the second device to automatically complete its own identity authentication without requiring the user to manually unlock it, and making cross-device communication more convenient. Furthermore, in the embodiment, identity authentication is performed on the second device based on the decrypted information. Thus, the identity authentication is completed by decrypting to obtain the decrypted information, which can improve the security of the identity authentication.

In some embodiments, the decrypting the identity authentication request based on the second shared information to obtain decrypted information includes:

obtaining key information of the second device based on the second shared information; and processing the identity authentication request based on the key information of the second device, to obtain the decrypted information.

In the embodiment, obtaining the key information of the second device based on the second shared information may include: obtaining a fourth key based on the second shared information and a preset encryption string; and obtaining a third key based on the second shared information and a preset signature string. In the embodiment, the third key is used for signature verification, and the fourth key is used for decryption.

Here, when the first shared information and the second shared information are the same, the first key and the fourth key are the same, and the second key and the third key are the same. Here, the specific process of obtaining the fourth key and the third key may refer to the process of obtaining the first key and the second key through model processing, which will not be described in the embodiment.

It should be noted that after the key information of the second device is generated, the key information of the second device can be stored in a secure area of the second device to improve storage security. Here, since the key information of the second device is generated after the cross-device identity authentication function of the second device is enabled, the time for generating the key information of the second device may be earlier than the time of using the key information of the second device for decryption, therefore, the generated key information of the second device can be stored in the secure area of the second device, and then during the decryption process, the key information of the second device can be obtained from the secure area of the second device.

In some embodiments, the identity authentication request is generated based on ciphertext information; the processing the identity authentication request based on the third key and the fourth key to obtain decrypted information, including:

splitting the ciphertext information to obtain split encrypted information and split signature information;

determining whether the ciphertext signature verification is successful based on the third key and the split signature information; and decrypting the split encrypted information using the fourth key to obtain the decrypted information when the ciphertext signature verification is successful.

In the embodiment of the present disclosure, the ciphertext information needs to be split first during the decryption process, and the splitting process corresponds to the splicing process for obtaining the ciphertext information. For example, the splicing process is obtained by splicing the signature information of the first device after the encrypted information of the first device. At this time, the splitting process is to split the ciphertext information based on the length of the encrypted information of the first device and the splicing position.

It should be noted that after splitting, the ciphertext needs to be verified first, and if the ciphertext signature verification is successful, the split encrypted information is decrypted to obtain the decrypted information.

In some embodiments, determining whether the ciphertext signature verification is successful based on the third key and the split signature information includes:

signing the split signature information using the third key to obtain signature verification information; and when the signature verification information and the split signature information are the same, determine that the ciphertext signature verification is successful.

In the disclosed embodiment, in the process of obtaining the signature verification information, the third key and the split signature information can be input into the second signature model to obtain the signature verification information. The second signature model includes but is not limited to HMAC model.

It should be noted that the signature verification information is the same as the split signature information. Correspondingly, the signature verification information contains the same content as the content of the split signature information.

In the embodiment of the present disclosure, when the signature verification information and the split signature information are different, it is determined that the ciphertext signature verification is failed. Here, the failure of ciphertext signature verification indicates that the ciphertext information may have been tampered with or disguised. In some embodiments, the method further includes: stopping decrypting the split encrypted information if the ciphertext signature verification is failed.

It should be noted that after the second device stops decrypting the split encrypted information, the second device can generate authentication failure information and send the authentication failure information to the first device to inform the first device that the identity authentication on the second device is failed during the identity authentication process.

In the embodiment, when the ciphertext signature verification is successful, the fourth key can be used to decrypt the split encrypted information to obtain the decrypted information. It should be noted that the first key and the fourth key are the same, so the split encrypted information can be decrypted based on the fourth key.

Figure 9:
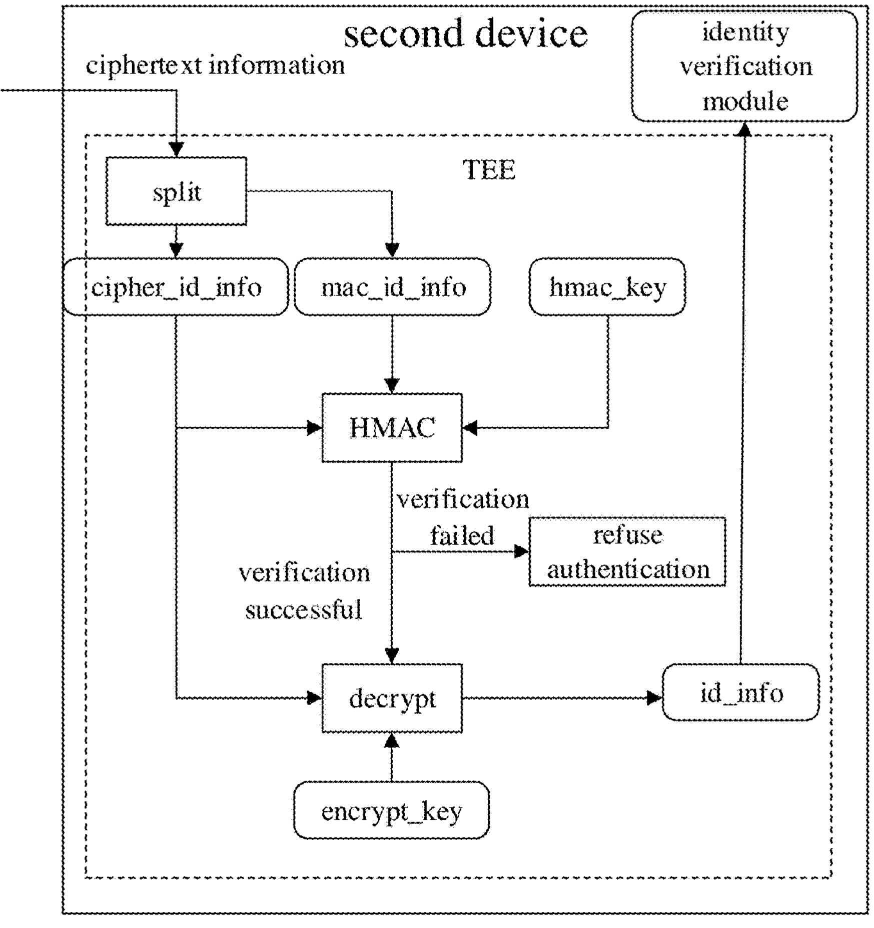
FIG. 9 is a schematic diagram of a second device performing a device interaction method according to an exemplary embodiment.

FIG. 9 is a schematic diagram of a second device performing the device interaction method according to an exemplary embodiment. As shown in FIG. 9, the second device first splits the obtained ciphertext information to obtain the split encryption information cipher_id_info and the split signature information mac_id_info; and then inputs the third key hmac_key and the split signature information mac_id_info into the HMAC model to obtain the signature verification information mac_id_info_temp; and compares the split signature information mac_id_info with the signature verification information mac_id_info_temp, and determines that the ciphertext signature verification is successful when the split signature information mac_id_info and the signature verification information mac_id_info_temp are the same; and determines that the ciphertext signature verification is failed when the split signature information mac_id_info and the signature verification information mac_id_info_temp are different; finally, when the ciphertext signature verification is successful, decrypts the split encryption information cipher_id_info using the fourth key encrypt_key to obtain the decrypted information id_info, and passes the decrypted information id_info to the identity verification module of the second device for identity authentication.

In some embodiments, the method further includes:

after the cross-device identity authentication function of the second device is enabled, detecting the input information of the second device; and in response to the input information of the second device being used to represent disabling the function, and identity verification of input user of the second device being verified, closing an entrance to the cross-device identity authentication function of the second device and deleting the key information of the second device.

In the embodiment of the present disclosure, the user may input information on the second device when the second device is in an unsafe state. For example, in order to prevent the second device from being illegally used when the second device is away from the user, information can be entered on the second device to turn off the function. The input information includes key input information, voice input information, gesture input information or touch input information, which is not limited in the embodiment of the present disclosure.

It should be noted that the input information being used to represent disabling the function, indicates that the second device has received a disabling request input by the user to disable the cross-device identity authentication function of the second device. The identity verification of the input user of the second device being verified, indicates that the input user of the second device is a legal user. Here, before executing the disabling request, the second device needs to confirm the legitimacy of the input user of the second device, so as to reduce the possibility of illegal operations being performed on the second device.

Figure 10:
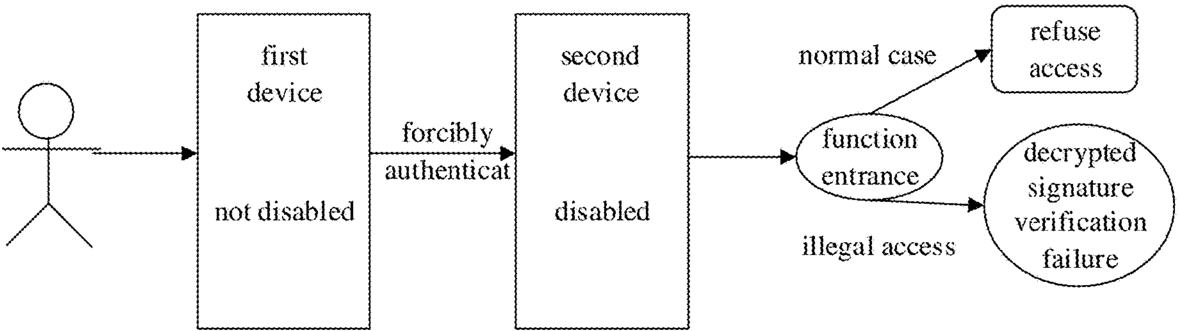
FIG. 10 is a schematic diagram showing a second device being forcibly authenticated according to an exemplary embodiment.

For example, as shown in FIG. 10, after disabling the cross-device identity authentication function of the second device, when the second device that has disabled the cross-device identity authentication function is forcibly authenticated by the first device that has not disabled the cross-device identity authentication function, since the entrance to the cross-device identity authentication function of the second device has been closed, the ciphertext information provided by the first device cannot be decrypted normally through this entrance, that is, the second device refuses access. Moreover, the key information of the second device has also been deleted, even if the entrance of the second device is illegally accessed, decryption and signature verification will be failed, making it impossible to authenticate the second device.

In the embodiment, the key information of the second device is generated when the cross-device identity authentication function of the second device is enabled, and is deleted when the cross-device identity authentication function of the second device is disabled. It is possible to achieved that when the second device is in a unsafe state, reduce the situation where the first device is used by an illegal user to forcibly access the second device that has turned off the cross-device identity authentication function, and the security of identity authentication is improved.

Figure 11:
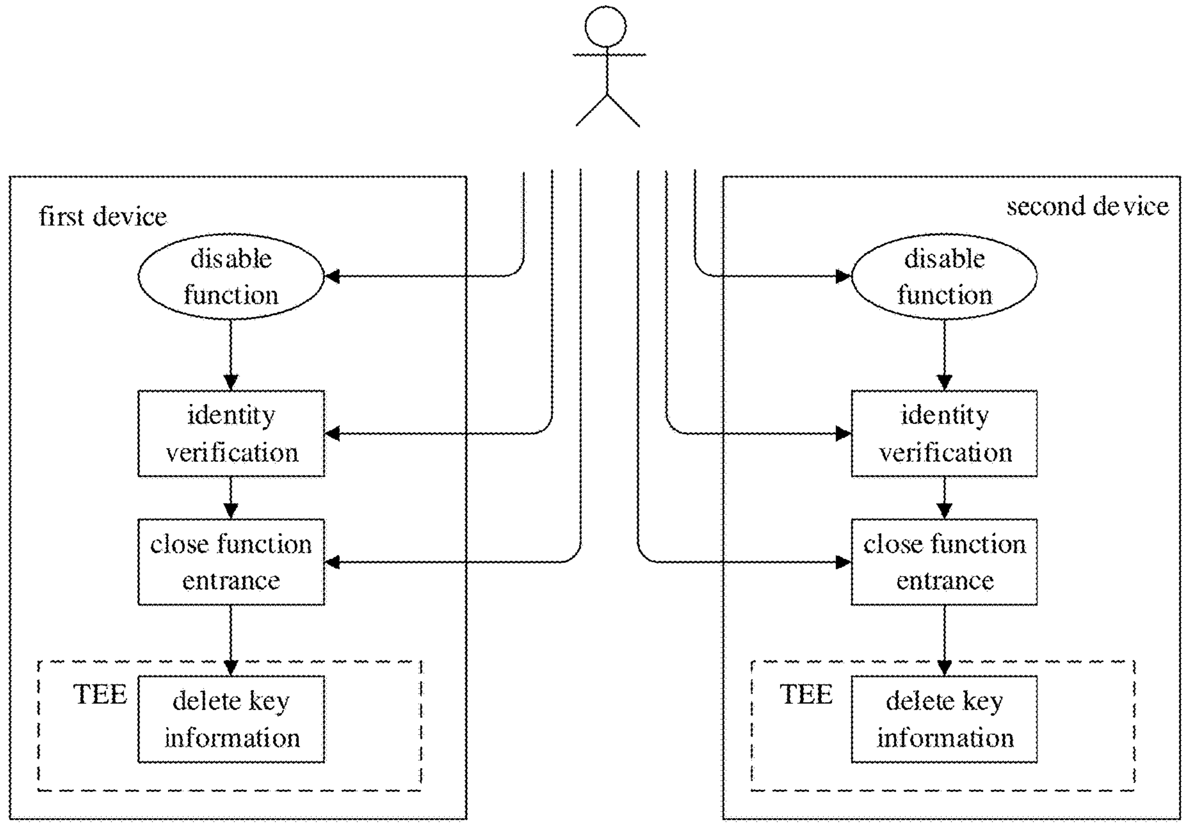
FIG. 11 is a schematic diagram of a second device disabling function according to an exemplary embodiment.

FIG. 11 is a schematic diagram illustrating a second device disabling the function according to an exemplary embodiment. As shown in FIG. 11, the disabling the function includes verification before the entrance for disabling the function, execution of closing the entrance for disabling the function, and deletion of the key information of the second device in the TEE.

Figure 12:
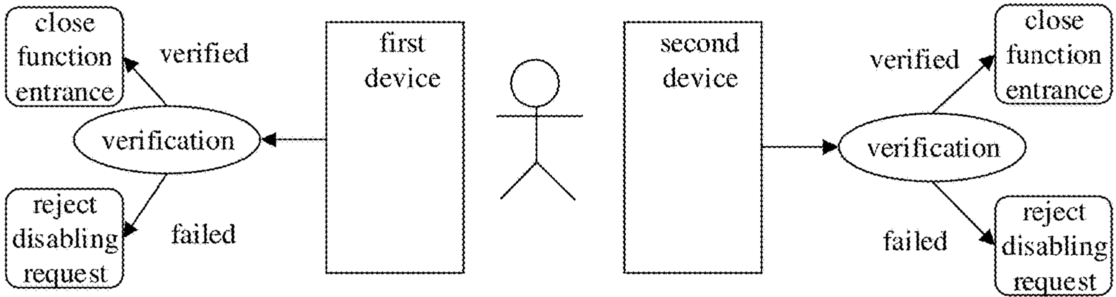
FIG. 12 is a schematic diagram of identity verification before disabling the function according to an exemplary embodiment.

FIG. 12 is a schematic diagram of identity verification before disabling the function according to an exemplary embodiment. As shown in FIG. 12, the function entrance is closed when the identity verification of the input user of the second device is verified; and the disabling request is rejected when the identity verification of the input user of the second device is failed. In the case where the first device serves as the accessed device, if the identity verification of the input user of the first device is verified, the function entrance is closed; and if the identity verification of the input user of the first device is failed, the disabling request is rejected.

Figure 13:
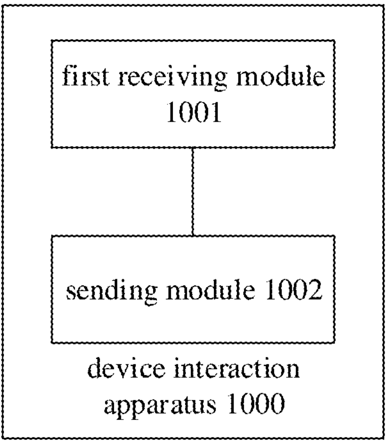
FIG. 13 is a block diagram of a device interaction apparatus according to an exemplary embodiment.

An embodiment of the present disclosure also provides a device interaction apparatus, which is applied in the first device. FIG. 13 is a block diagram of a device interaction apparatus according to an exemplary embodiment. As shown in FIG. 13, the device interaction apparatus 1000 includes:

a first receiving module 1001, configured to receive identity authentication information input by a user in a case that a cross-device identity authentication function of the first device is enabled; and a sending module 1002, configured to send an identity authentication request to a second device that has established communication with the first device, wherein the identity authentication information is carried in the identity authentication request, and the identity authentication request is configured to request the second device in a locked state to perform identity authentication according to the identity authentication information.

In some embodiments, the apparatus further includes:

a first verification receiving module, configured to receive first verification information; and a first enabling module, configured to enable the cross-device identity authentication function of the first device in response to the first verification information being verified.

In some embodiments, the apparatus further includes:

a first acquiring module, configured to acquire first shared information; and a request generating module, configured to, before sending the identity authentication request to the second device that has established communication with the first device, generate the identity authentication request according to the first shared information and the identity authentication information.

In some embodiments, the request generating module is further configured to encrypt the identity authentication information according to the first shared information, to obtain ciphertext information; and generate the identity authentication request according to the ciphertext information.

In some embodiments, the request generating module is further configured to obtain a first key and a second key according to the first shared information; encrypt the identity authentication information input by the user based on the first key, to obtain encrypted information of the first device; sign the encrypted information of the first device based on the second key, to obtain signature information of the first device; and splice the signature information of the first device and the encrypted information of the first device, to obtain the ciphertext information.

In some embodiments, the request generating module is further configured to perform data type conversion on the identity authentication information input by the user, to obtain the identity authentication information of byte array type; and encrypt the identity authentication information of byte array type using the first key, to obtain the encrypted information of the first device.

Figure 14:
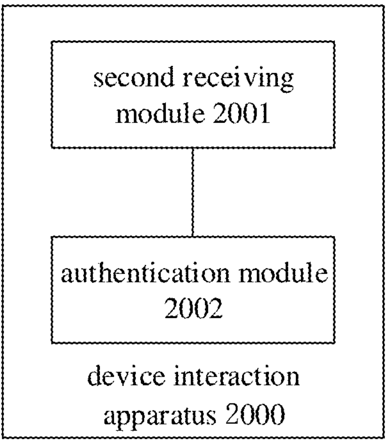
FIG. 14 is a block diagram of a device interaction apparatus according to an exemplary embodiment.

An embodiment of the present disclosure also provides a device interaction apparatus, which is applied in the second device. FIG. 14 is a block diagram of a device interaction apparatus according to an exemplary embodiment. As shown in FIG. 14, the device interaction apparatus 2000 includes:

a second receiving module 2001, configured to receive an identity authentication request sent by a first device that has established communication with the second device, wherein a cross-device identity authentication function of the second device is enabled and the second device is in a locked state; and an authentication module 2002, configured to perform identity authentication in response to the identity authentication request.

In some embodiments, the apparatus further includes:

a second verification receiving module, configured to receive second verification information; and a second enabling module, configured to enable the cross-device identity authentication function of the second device in response to the second verification information being verified.

In some embodiments, the apparatus further includes:

a second acquiring module, configured to acquire second shared information; and the authentication module 2002 is further configured to perform identity authentication based on the second shared information and the identity authentication request in response to the identity authentication request.

In some embodiments, the authentication module 2002 is further configured to decrypt the identity authentication request based on the second shared information, to obtain decrypted information; and perform identity authentication on the second device based on the decrypted information.

In some embodiments, the authentication module 2002 is further configured to obtain key information of the second device based on the second shared information; and process the identity authentication request based on the key information of the second device, to obtain the decrypted information.

In some embodiments, the identity authentication request is generated based on ciphertext information; the key information of the second device comprises a third key and a fourth key; and the authentication module 2002 is further configured to split the ciphertext information to obtain split encrypted information and split signature information; judge whether ciphertext signature verification is successful based on the third key and the split signature information; and decrypt the split encrypted information using the fourth key in a case that the ciphertext signature verification is successful, to obtain the decrypted information.

In some embodiments, the authentication module 2002 is further configured to sign the split signature information using the third key to obtain signature verification information; and determine that the ciphertext signature verification is successful in a case that the signature verification information is same as the split signature information.

In some embodiments, the apparatus further includes:

a stopping decryption module, configured to stop decryption of the split encrypted information in response to failure of the ciphertext signature verification.

In some embodiments, the apparatus further includes:

a detecting module, configured to, after the cross-device identity authentication function of the second device is enabled, detect input information of the second device; and a function disable module, configured to, in response to the input information of the second device being used to represent disabling the function, and identity verification of input user of the second device being verified, close an entrance to the cross-device identity authentication function of the second device and delete the key information of the second device.

The specific manner in which each module in the device of the above embodiment performs operations has been described in detail in the embodiment of the method, and will not be described in detail here.

Figure 15:
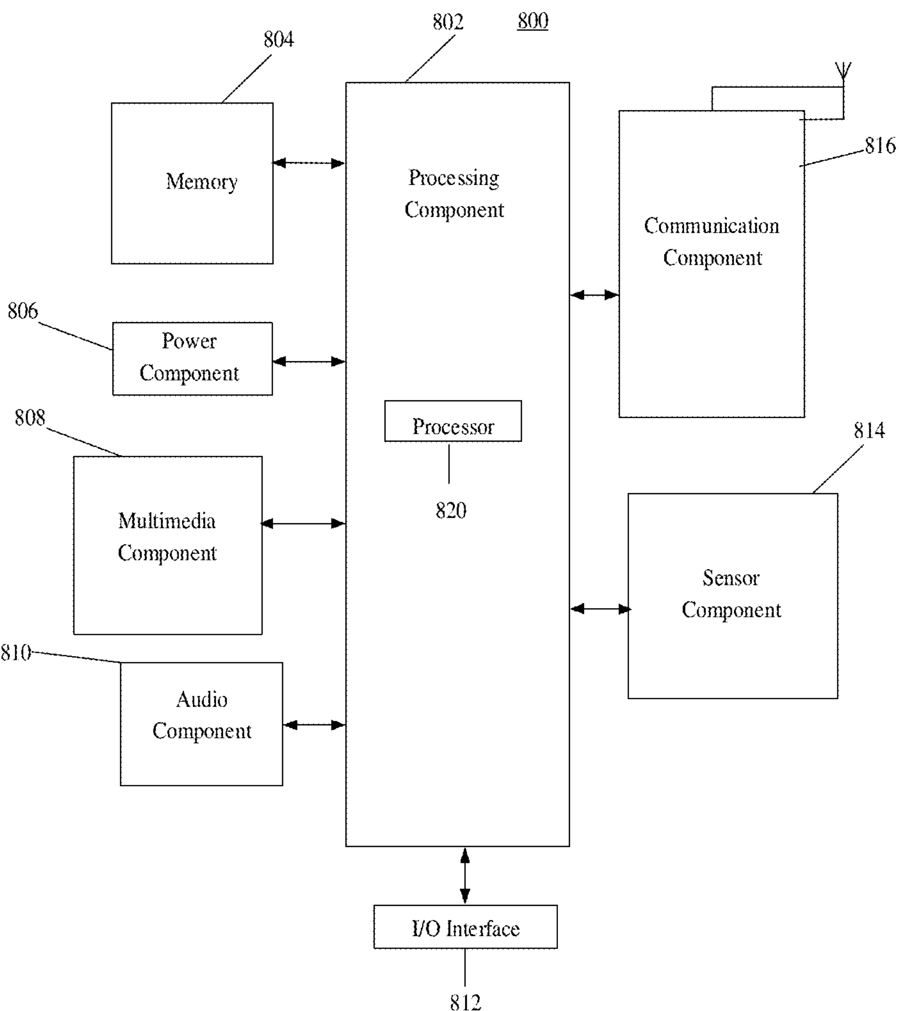
FIG. 15 is a block diagram of an electronic device according to an exemplary embodiment.

FIG. 15 is a block diagram of an electronic device 800 according to an exemplary embodiment. For example, the electronic device 800 may be a mobile phone, a computer, a digital broadcast terminal, a messaging device, a game console, a tablet device, a medical device, a fitness device, a personal digital assistant, and the like.

Referring to FIG. 15, the electronic device 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the electronic device 800, such as operations associated with display, telephone calls, data communications, camera operations, and recording operations. The processing component 802 may include one or more processors 820 to execute instructions to complete all or part of the steps of the above method. Additionally, processing component 802 may include one or more modules that facilitate interaction between processing component 802 and other components. For example, processing component 802 may include a multimedia module to facilitate interaction between multimedia component 808 and processing component 802.

The memory 804 is configured to store various types of data to support operations at the electronic device 800. Examples of such data include instructions for any application or method operating on the electronic device 800, contact data, phonebook data, messages, pictures, videos, etc. The memory 804 can be realized by any type of volatile or non-volatile storage device or their combination, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 806 provides power to various components of the electronic device 800. The power component 806 may include a power management system, one or more power supplies, and other components associated with generating, managing, and distributing power for electronic device 800.

The multimedia component 808 includes a screen providing an output interface between the electronic device 800 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. The touch sensor may not only sense a boundary of a touch or a swipe action, but also detect duration and pressure associated with the touch or swipe operation. In some embodiments, the multimedia component 808 includes a front camera and/or a rear camera. When the device 800 is in an operation mode, such as a photographing mode or a video mode, the front camera and/or the rear camera can receive external multimedia data. Each front camera and rear camera can be a fixed optical lens system or have focal length and optical zoom capability.

The audio component 810 is configured to output and/or input audio signals. For example, the audio component 810 includes a microphone (MIC), which is configured to receive an external audio signal when the electronic device 800 is in an operation mode, such as a call mode, a recording mode and a voice recognition mode. Received audio signals may be further stored in memory 804 or sent via communication component 816. In some embodiments, the audio component 810 also includes a speaker for outputting audio signals.

The I/O interface 812 provides an interface between the processing component 802 and a peripheral interface module, which may be a keyboard, a click wheel, a button, and the like. These buttons may include, but are not limited to: a home button, volume buttons, start button, and lock button.

The sensor component 814 includes one or more sensors for providing the electronic device 800 with various aspects of status assessment. For example, the sensor component 814 can detect the open/closed state of the electronic device 800, the relative positioning of components, such as the display and the keypad of the electronic device 800, the sensor component 814 can also detect the electronic device 800 or a change in the position of a component of the electronic device 800, the presence or absence of user's contact with the electronic device 800, the change of orientation or acceleration/deceleration of the electronic device 800 and the temperature change of the terminal 800. The sensor component 814 may include a proximity sensor configured to detect the presence of nearby objects in the absence of any physical contact. The sensor component 814 may also include an optical sensor, such as a CMOS or CCD image sensor, for use in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the electronic device 800 and other devices. The electronic device 800 can access a wireless network based on communication standards, such as WiFi, 4G, 5G or 6G, or a combination thereof. In an exemplary embodiment, the communication component 816 receives broadcast signals or broadcast related information from an external broadcast management system via a broadcast channel. In an exemplary embodiment, the communication component 816 also includes a near field communication (NFC) module to facilitate short-range communication. For example, the NFC module can be implemented based on radio frequency identification (RFID) technology, infrared data association (IrDA) technology, ultra wideband (UWB) technology, bluetooth (BT) technology and other technologies.

In an exemplary embodiment, the electronic device 800 may be implemented by one or more application specific integrated circuits (ASIC), digital signal processors (DSP), digital signal processing devices (DSPD), programmable logic devices (PLD), field programmable gate array (FPGA), controllers, microcontrollers, microprocessors or other electronic components for performing the method described above.

In an exemplary embodiment, there is also provided a non-transitory computer-readable storage medium including instructions, such as the memory 804 including instructions, which can be executed by the processor 820 of the electronic device 800 to implement the above method. For example, the non-transitory computer readable storage medium may be ROM, random access memory (RAM), CD-ROM, magnetic tape, floppy disk, and optical data storage device, and the like.

In an exemplary embodiment, there is also provided a non-transitory computer-readable storage medium. When instructions in the storage medium are executed by a processor of a first device, the first device is caused to perform the device interaction method described in one or more of the above embodiments; or, when the instructions in the storage medium are executed by a processor of a second device, the second device is caused to perform the device interaction method described in one or more embodiments.

The present disclosure provides a device interaction method and apparatus, electronic device, and storage medium, which can make cross-device communication more convenient.

According to a first aspect of an embodiment of the present disclosure, a device interaction method is provided, which is applied to a first device and includes at least:

- receiving identity authentication information input by a user in a case that a cross-device identity authentication function of the first device is enabled; and sending an identity authentication request to a second device that has established communication with the first device, wherein the identity authentication information is carried in the identity authentication request, and the identity authentication request is configured to request the second device in a locked state to perform identity authentication according to the identity authentication information.

In some embodiments, the method further includes receiving first verification information; and enabling the cross-device identity authentication function of the first device in response to the first verification information being verified.

In some embodiments, the method further includes:

acquiring first shared information; and before sending the identity authentication request to the second device that has established communication with the first device, the method further includes:

generating the identity authentication request according to the first shared information and the identity authentication information.

In some embodiments, the generating the identity authentication request according to the first shared information and the identity authentication information includes:

encrypting the identity authentication information according to the first shared information, to obtain ciphertext information; and generating the identity authentication request according to the ciphertext information.

In some embodiments, the encrypting the identity authentication information according to the first shared information to obtain the ciphertext information includes:

obtaining a first key and a second key according to the first shared information;

encrypting the identity authentication information input by the user based on the first key, to obtain encrypted information of the first device;

signing the encrypted information of the first device based on the second key, to obtain signature information of the first device; and splicing the signature information of the first device and the encrypted information of the first device, to obtain the ciphertext information.

In some embodiments, the encrypting the identity authentication information input by the user based on the first key to obtain the encrypted information of the first device includes:

performing data type conversion on the identity authentication information input by the user, to obtain the identity authentication information of byte array type; and encrypting the identity authentication information of byte array type using the first key, to obtain the encrypted information of the first device.

According to a second aspect of the embodiment of present disclosure, a device interaction method is provided, which is applied to a second device and includes at least:

receiving an identity authentication request sent by a first device that has established communication with the second device, wherein a cross-device identity authentication function of the second device is enabled and the second device is in a locked state; and performing identity authentication in response to the identity authentication request.

In some embodiments, the method further includes:

receiving second verification information; and enabling the cross-device identity authentication function of the second device in response to the second verification information being verified.

In some embodiments, the method further includes:

acquiring second shared information; and the performing identity authentication in response to the identity authentication request includes:

performing identity authentication based on the second shared information and the identity authentication request in response to the identity authentication request.

In some embodiments, the performing identity authentication based on the second shared information and the identity authentication request includes:

decrypting the identity authentication request based on the second shared information, to obtain decrypted information; and performing identity authentication on the second device based on the decrypted information.

In some embodiments, decrypting the identity authentication request based on the second shared information to obtain decrypted information includes:

obtaining key information of the second device based on the second shared information; and processing the identity authentication request based on the key information of the second device, to obtain the decrypted information.

In some embodiments, the identity authentication request is generated based on ciphertext information; the key information of the second device includes a third key and a fourth key; and the processing the identity authentication request based on the key information of the second device to obtain the decrypted information includes:

splitting the ciphertext information to obtain split encrypted information and split signature information;

judging whether ciphertext signature verification is successful based on the third key and the split signature information; and decrypting the split encrypted information using the fourth key in a case that the ciphertext signature verification is successful, to obtain the decrypted information.

In some embodiments, the judging whether ciphertext signature verification is successful based on the third key and the split signature information includes:

signing the split signature information using the third key to obtain signature verification information; and determining that the ciphertext signature verification is successful in a case that the signature verification information is same as the split signature information.

In some embodiments, the method further includes:

stopping decryption of the split encrypted information in response to failure of the ciphertext signature verification.

In some embodiments, the method further includes:

after the cross-device identity authentication function of the second device is enabled, detecting input information of the second device; and in response to the input information of the second device being used to represent disabling the cross-device identity authentication function, and identity verification of input user of the second device being verified, closing an entrance to the cross-device identity authentication function of the second device and deleting the key information of the second device.

According to a third aspect of the embodiment of the present disclosure, a device interaction apparatus is provided, which is applied to a first device and includes at least:

a first receiving module, configured to receive identity authentication information input by a user in a case that a cross-device identity authentication function of the first device is enabled; and a seconding module, configured to send an identity authentication request to a second device that has established communication with the first device, wherein the identity authentication information is carried in the identity authentication request, and the identity authentication request is configured to request the second device in a locked state to perform identity authentication according to the identity authentication information.

According to a fourth aspect of the embodiment of the present disclosure, a device interaction apparatus is provided, which is applied to a second device and includes at least:

a second receiving module, configured to receive an identity authentication request sent by a first device that has established communication with the second device, wherein a cross-device identity authentication function of the second device is enabled and the second device is in a locked state; and an authentication module, configured to perform identity authentication in response to the identity authentication request.

According to a fifth aspect of the embodiment of the present disclosure, there is provided an electronic device at least including:

a processor; and a memory configured to store instructions executable by the processor;

wherein the processor is configured to perform the device interaction method according to the above first aspect or the second aspect.

According to a sixth aspect of the embodiment of the present disclosure, there is provided a storage medium including:

when instructions in the storage medium are executed by a processor of a first device, enables the first device to perform the device interaction method according to the above first aspect; or, when instructions in the storage medium are executed by a processor of a second device, enables the second device to perform the device interaction method according to the above second aspect.

The technical solutions provided by the embodiments of the present disclosure may include the following beneficial effects:

In the embodiment of the present disclosure, when the second device is in a locked state, the first device can send an identity authentication request to the second device to enable the second device to complete the identity authentication, thereby establishing cross-device communication interaction between the first device and the second device.

It is to be understood that both the foregoing general description and the following detailed description are exemplary and explanatory only and are not restrictive of the disclosure.

Other embodiments of the invention will be readily apparent to those skilled in the art from consideration of the specification and practice of the disclosure disclosed herein. This disclosure is intended to cover any modification, use or adaptation of the present disclosure, these modifications, uses or adaptations follow the general principles of the present disclosure and include common knowledge or conventional technical means in the technical field not disclosed in this disclosure. The specification and examples are to be considered exemplary only, with a true scope and spirit of the disclosure being indicated by the following claims.

It should be understood that the present disclosure is not limited to the precise constructions which have been described above and shown in the accompanying drawings, and various modifications and changes may be made without departing from the scope thereof. The scope of the disclosure is limited only by the appended claims.

What is claimed is:

1. A device interaction method performed by a first device, comprising:

receiving identity authentication information input by a user in a case that a cross-device identity authentication function of the first device is enabled; and acquiring first shared information;

obtaining a first key and a second key according to the first shared information;

performing data type conversion on the identity authentication information input by the user, to obtain the identity authentication information of byte array type;

encrypting the identity authentication information of byte array type using the first key, to obtain encrypted information of the first device;

signing the encrypted information of the first device based on the second key, to obtain signature information of the first device;

splicing the signature information of the first device and the encrypted information of the first device, to obtain ciphertext information;

generating an identity authentication request according to the ciphertext information; and sending the identity authentication request to a second device that has established communication with the first device, wherein the identity authentication information is carried in the identity authentication request, and the identity authentication request is configured to request the second device in a locked state to perform identity authentication according to the identity authentication information.

2. The method according to claim 1, further comprising:

receiving first verification information; and enabling the cross-device identity authentication function of the first device in response to the first verification information being verified.

3. A non-transitory computer-readable storage medium storing instructions that, when executed by a processor of an electronic device, cause the electronic device to perform the device interaction method according to claim 1.

4. A device interaction method performed by a second device, comprising:

acquiring second shared information;

obtaining key information of the second device based on the second shared information, wherein the key information of the second device comprises a first key and a second key;

receiving an identity authentication request sent by a first device that has established communication with the second device, wherein a cross-device identity authentication function of the second device is enabled and the second device is in a locked state, and wherein the identity authentication request is generated based on ciphertext information;

splitting the ciphertext information to obtain split encrypted information and split signature information;

judging whether ciphertext signature verification is successful based on the first key and the split signature information;

decrypting the split encrypted information using the second key in a case that the ciphertext signature verification is successful, to obtain decrypted information; and performing identity authentication on the second device in response to the identity authentication request based on the decrypted information.

5. The method according to claim 4, further comprising:

receiving second verification information; and enabling the cross-device identity authentication function of the second device in response to the second verification information being verified.

6. The method according to claim 4, wherein the judging whether ciphertext signature verification is successful based on the first key and the split signature information comprises:

signing the split signature information using the first key to obtain signature verification information; and determining that the ciphertext signature verification is successful in a case that the signature verification information is same as the split signature information.

7. The method according to claim 4, further comprising:

stopping decryption of the split encrypted information in response to failure of the ciphertext signature verification.

8. The method according to claim 4, further comprising:

after the cross-device identity authentication function of the second device is enabled, detecting input information of the second device; and in response to the input information of the second device being used to represent disabling the cross-device identity authentication function, and identity verification of input user of the second device being verified, closing an entrance to the cross-device identity authentication function of the second device and deleting the key information of the second device.

9. An electronic device, comprising:

a hardware processor; and a hardware memory configured to store instructions executable by the processor;

wherein the processor is configured to perform the device interaction method according to claim 4.

10. A non-transitory computer-readable storage medium storing instructions that, when executed by a processor of an electronic device, cause the electronic device to perform the device interaction method according to claim 4.

11. An electronic device, comprising:

a hardware processor; and a hardware memory configured to store instructions executable by the processor;

wherein the processor is configured to:

receive identity authentication information input by a user in a case that a cross-device identity authentication function of the electronic device is enabled;

acquire first shared information;

obtain a first key and a second key according to the first shared information;

perform data type conversion on the identity authentication information input by the user, to obtain the identity authentication information of byte array type;

encrypt the identity authentication information input by the user based on the first key, to obtain encrypted information of a first device;

sign the encrypted information of the first device based on the second key, to obtain signature information of the first device;

splice the signature information of the first device and the encrypted information of the first device, to obtain ciphertext information;

generate an identity authentication request according to the ciphertext information; and send the identity authentication request to a second device that has established communication with the electronic device, wherein the identity authentication information is carried in the identity authentication request, and the identity authentication request is configured to request the second device in a locked state to perform identity authentication according to the identity authentication information.

* * * * *